(12) United States Patent
Bizzini

(10) Patent No.: US 9,651,083 B2
(45) Date of Patent: May 16, 2017

(54) RING FOR ATTACHING A BOLT TO A SUPPORT AND ASSEMBLY OBTAINED

(71) Applicant: A RAYMOND ET CIE, Grenoble (FR)

(72) Inventor: Olivier Bizzini, Saint Egreve (FR)

(73) Assignee: A. RAYMOND ET CIE, Grenoble (FR)

( * ) Notice: Subject to any disclaimer, the term of this patent is extended or adjusted under 35 U.S.C. 154(b) by 182 days.

(21) Appl. No.: 14/416,695

(22) PCT Filed: Jul. 25, 2013

(86) PCT No.: PCT/EP2013/065715
§ 371 (c)(1),
(2) Date: Jan. 23, 2015

(87) PCT Pub. No.: WO2014/032873
PCT Pub. Date: Mar. 6, 2014

(65) Prior Publication Data
US 2015/0167728 A1 Jun. 18, 2015

(30) Foreign Application Priority Data

Aug. 28, 2012 (FR) ..................................... 12 58031

(51) Int. Cl.
*F16B 37/08* (2006.01)
*F16B 43/00* (2006.01)
*F16B 37/02* (2006.01)

(52) U.S. Cl.
CPC .......... *F16B 43/00* (2013.01); *F16B 37/0842* (2013.01); *F16B 37/02* (2013.01)

(58) Field of Classification Search
CPC .... F16B 21/20; F16B 37/0842; Y10T 24/366; Y10T 24/3683; Y10T 24/45775
(Continued)

(56) References Cited

U.S. PATENT DOCUMENTS

| 312,943 A | * | 2/1885 | Winans ..................... A44B 1/34 |
| | | | 24/114.4 |
| 2,197,220 A | * | 4/1940 | Kost ....................... F16B 37/02 |
| | | | 411/528 |

(Continued)

FOREIGN PATENT DOCUMENTS

| DE | 3600311 A1 | 9/1986 |
| DE | 202007013238 U1 | 2/2009 |

(Continued)

*Primary Examiner* — Flemming Saether
(74) *Attorney, Agent, or Firm* — Ware, Fressola, Maguire & Barber LLP

(57) ABSTRACT

A fastener ring (1a) for fastening to a rod (201a) on a support (200a), which fastener ring comprises both a body (2a) through which an axial orifice (3) passes that serves to receive said rod (201a), and flexible tabs (4, 5, 6) extending radially towards the main axis (A) of the axial orifice (3) and serving to co-operate with the rod (201a) to hold it stationary axially, the flexible tabs (4, 5, 6) including a set of star-shaped tabs (4), each of which comprises a tongue (40) secured to the body (2a), and extended by a star-shaped head (41) made up of a rounded radial tip (42) and of two radially rounded side cheeks (43) remote from the body (2a), the width (L2) of the tongue (40) being less than the maximum width (L1) of the star-shaped head (41). An assembly comprising a part for assembly (100a) that is provided with such a fastener ring (1a) for fastening to a support provided with at least one rod.

11 Claims, 4 Drawing Sheets

(58) Field of Classification Search
USPC .......................................... 411/525, 526, 528
See application file for complete search history.

(56) References Cited

U.S. PATENT DOCUMENTS

| | | | | | |
|---|---|---|---|---|---|
| 2,266,049 | A | * | 12/1941 | Kost ....................... | F16B 21/20 411/520 |
| 2,577,319 | A | * | 12/1951 | Feitl ........................ | F16B 21/20 411/521 |
| 3,144,695 | A | * | 8/1964 | Budwig ................... | F16L 3/137 24/16 PB |
| 3,673,911 | A | * | 7/1972 | Ramillon ................ | A63C 11/24 24/108 |
| 5,707,192 | A | * | 1/1998 | Vortriede ............... | F16B 37/041 411/175 |
| 7,670,079 | B2 | * | 3/2010 | Snadden ................. | F16B 21/20 384/535 |

FOREIGN PATENT DOCUMENTS

| | | |
|---|---|---|
| DE | 102010018091 A1 | 10/2011 |
| EP | 1472464 A2 | 11/2004 |
| JP | 2005076646 A | 3/2005 |
| WO | 99/08006 A1 | 2/1999 |

\* cited by examiner

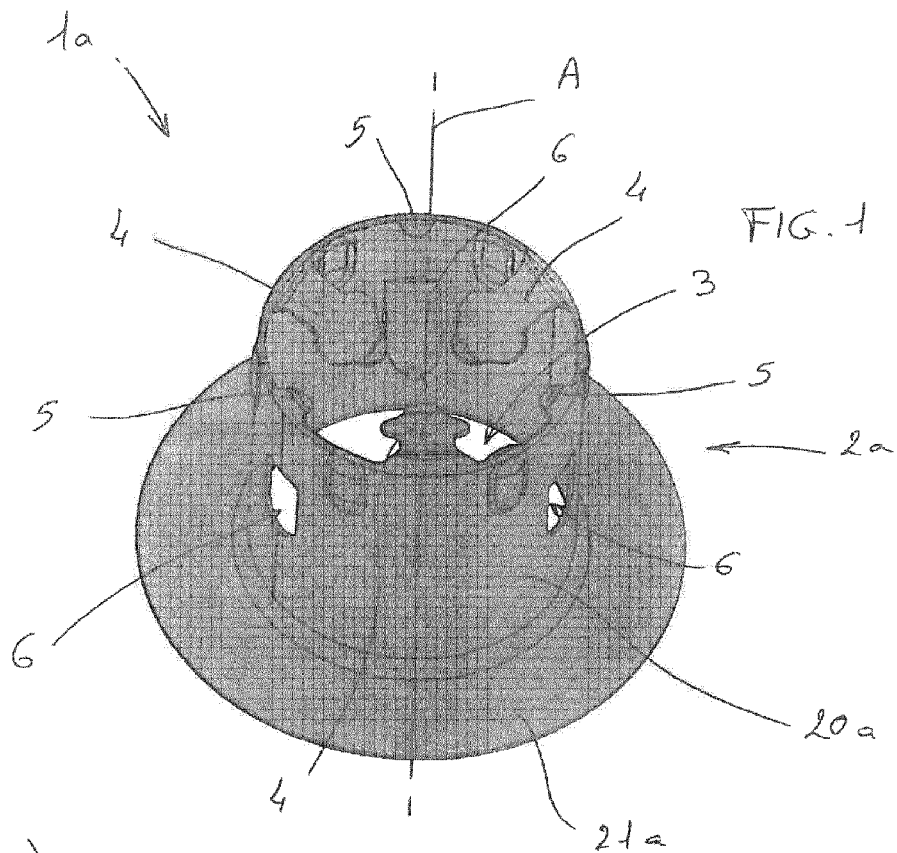
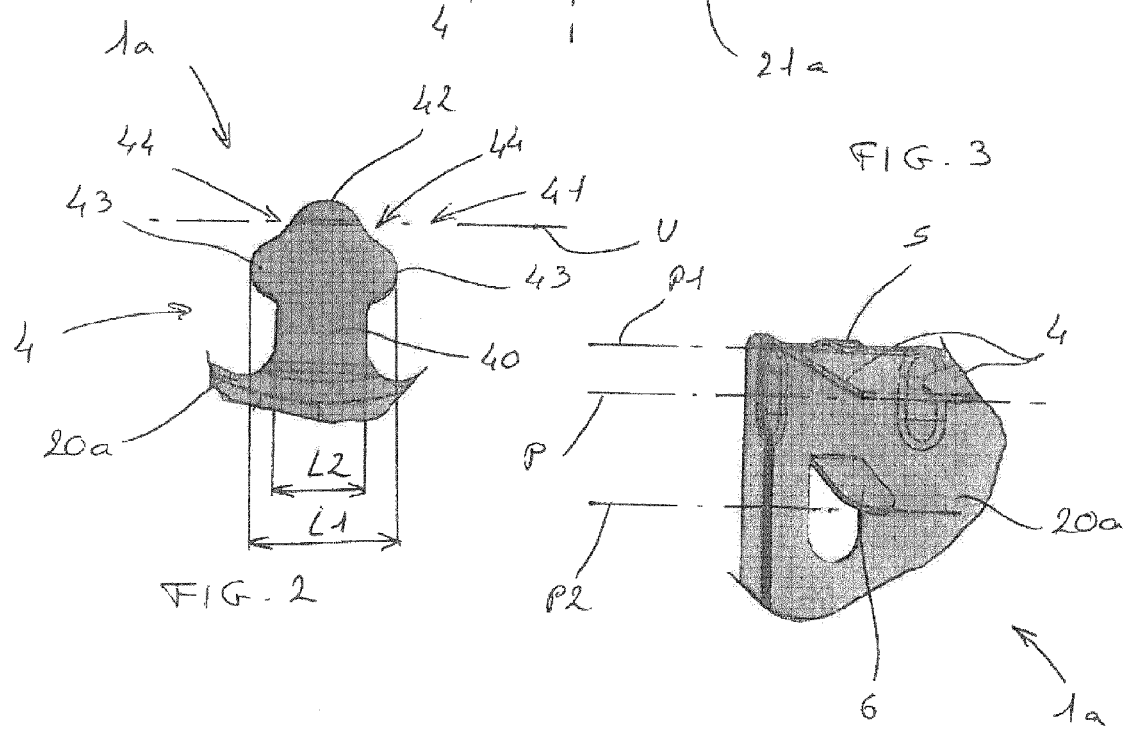

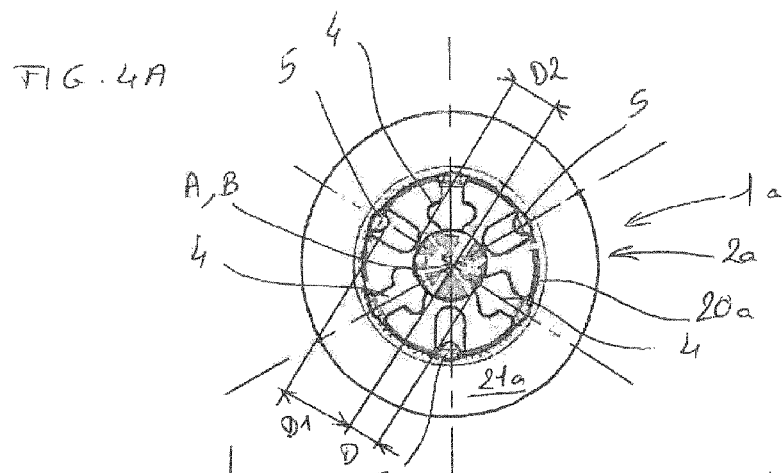
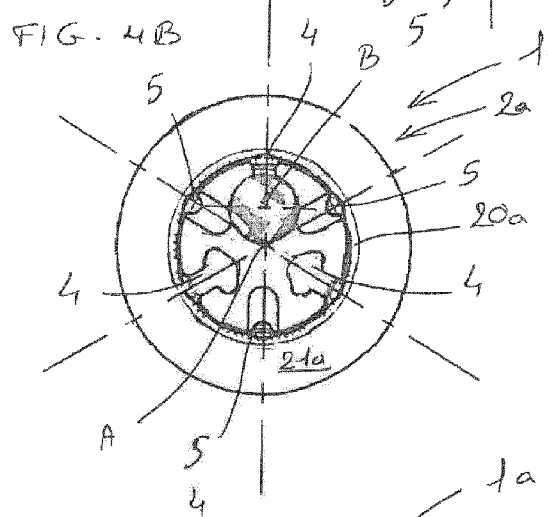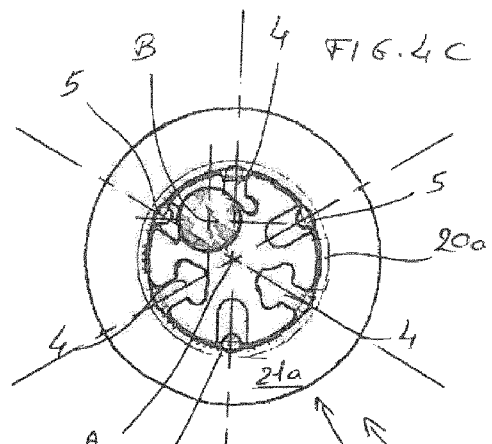
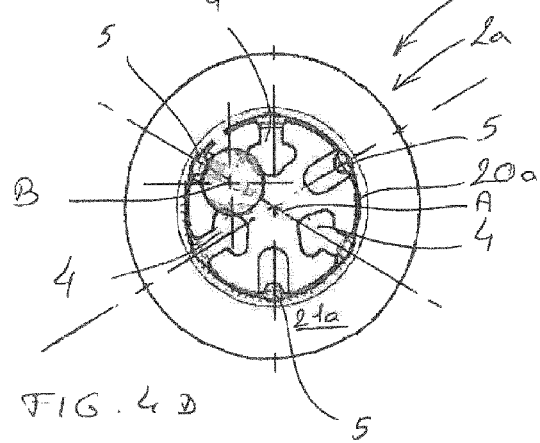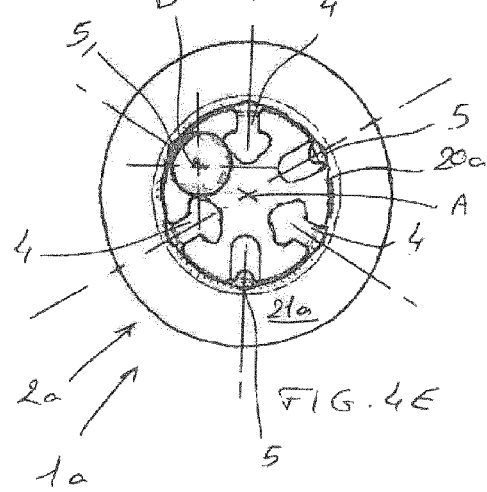

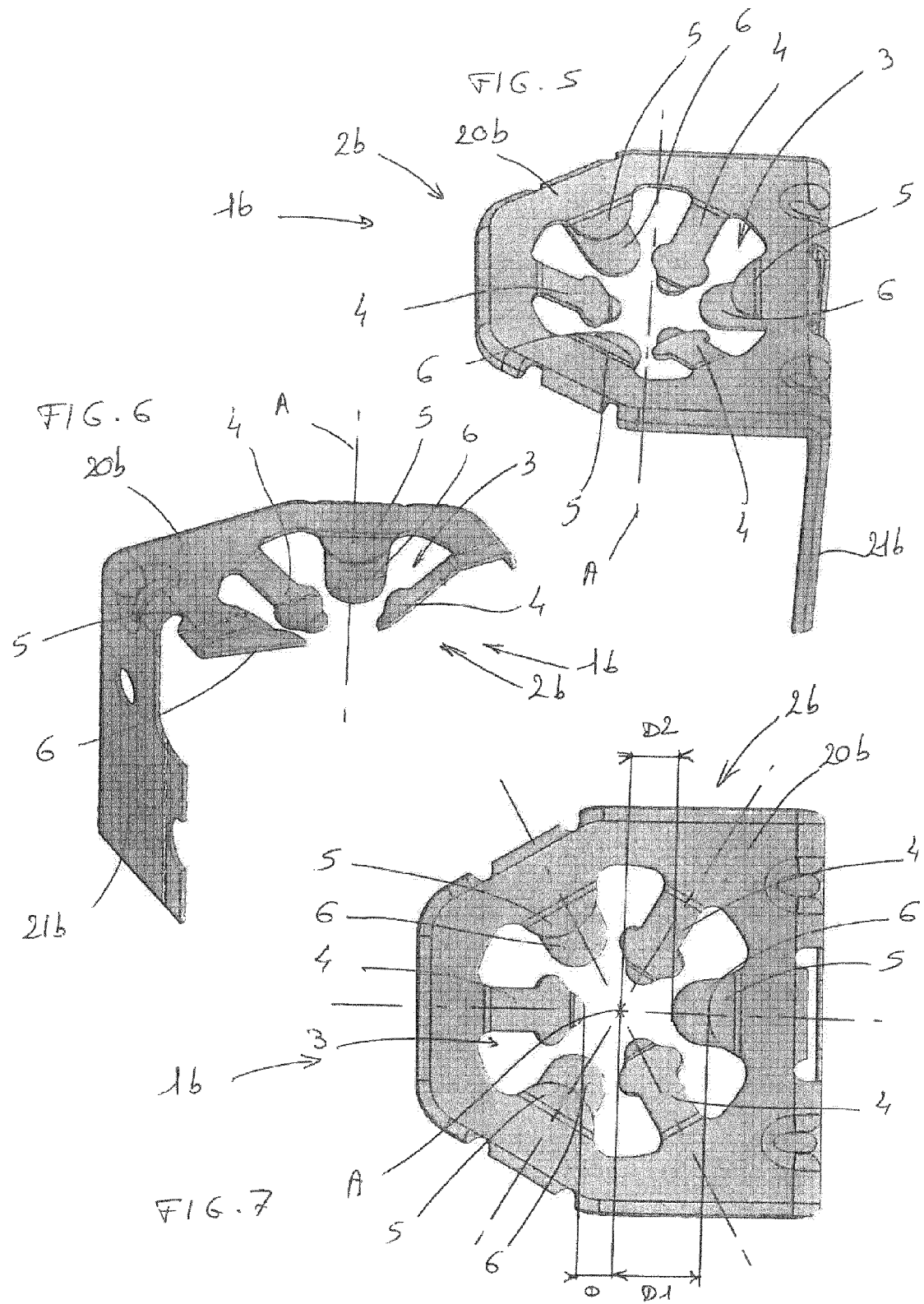

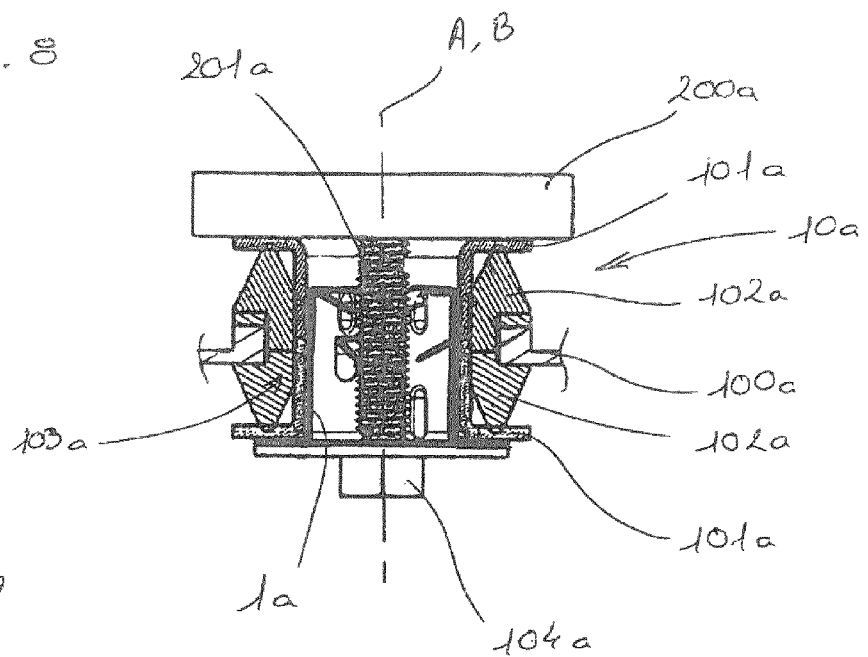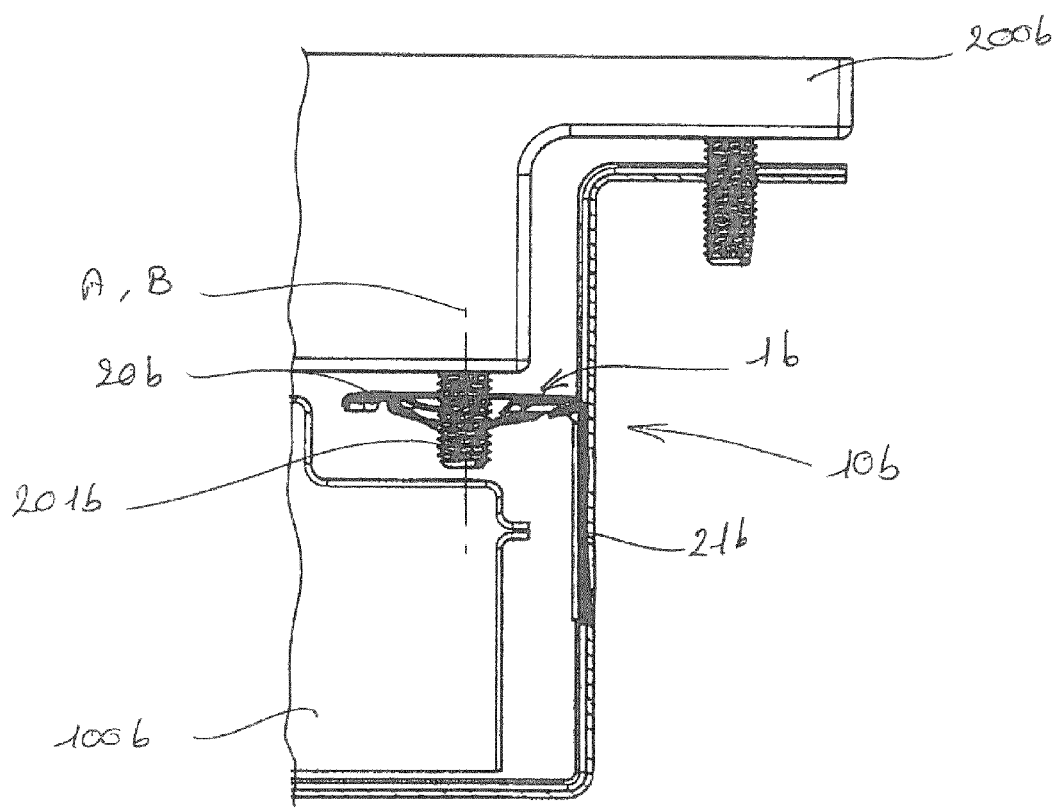

RING FOR ATTACHING A BOLT TO A SUPPORT AND ASSEMBLY OBTAINED

CROSS REFERENCE TO RELATED APPLICATIONS

This application is the U.S. National Stage of International Application Number PCT/EP2013/065715 filed on Jul. 25, 2013 which application claims priority under 35 USC §119 to French Patent Application No. 1258031 filed on Aug. 28, 2012. Both applications are hereby incorporated by reference in their entirety.

TECHNICAL FIELD

The invention relates generally to the field of temporary fastening, and in particular to temporarily fastening a fuel tank to a rod secured to a motor vehicle chassis before the tank is fastened permanently. The invention relates more particularly to a fastener ring for fastening to a rod, which fastener ring comprises both a body through which an axial orifice passes that serves to receive the rod, and flexible tabs extending radially from the body towards the main axis of the axial orifice and serving to co-operate with the rod to hold it stationary axially relative to the fastener ring. The invention also relates to an assembly comprising a part for assembly as assembled to a support that is provided with at least one rod.

PRIOR ART

Numerous fastener rings of this type exist.

Publication DE 20 2007 013 238 describes a fastener ring that, in one of its versions, has a set of six first flexible tabs provided at an axial end of the body and one or more sets of four second tabs that are axially offset relative to the first tabs. The free ends of the second tabs are C-shaped or V-shaped, with the recesses of these shapes extending radially and with the ends of these shapes forming spikes serving to engage in the threads or notches of a threaded or notched rod so as to hold it stationary axially. When using that fastener ring, the central axis of the rod necessarily coincides with the main axis of the ring. Thus, in order for the fastener ring to be capable of receiving the rod and of locking it, the central axis of the rod needs to be accurately positioned, which is incompatible with the dimensional dispersions related to methods of manufacturing tanks made of plastics materials.

Publication JP 2005 076 646 describes a fastener ring that is provided with a set of four flexible tabs and that suffers from the same drawbacks as the preceding publication.

Publication EP 1 472 464 describes a fastener ring that has two flexible tabs, each of which has a plurality of notches extending transversely and perpendicularly to the main axis of the fastener ring and in a radial plane. Thus, that fastener ring can accommodate dispersion of the transverse position of the rod in one direction only. As a result, that fastener ring does not make it possible to provide a fully satisfactory solution to the problem encountered.

SUMMARY OF THE INVENTION

An object of the invention is to remedy those drawbacks by proposing a fastener ring that is easy to manufacture, that accepts dispersions in the positioning of the central axis of the rod to be held relative to the positioning of the main axis of the fastener ring, and that makes it possible to achieve effective temporary fastening of a part for assembly to a support.

To this end, the invention provides a fastener ring for fastening to a rod on a support, which fastener ring comprises both a body through which an axial orifice passes that serves to receive the rod, and flexible tabs extending radially from the body towards the main axis of the axial orifice and serving to co-operate with the rod to hold it stationary axially relative to the fastener ring, the fastener ring being characterized in that the flexible tabs include a set of star-shaped tabs, each of which comprises a tongue secured to the body, and extended by a star-shaped head made up of a rounded radial tip and of two radially rounded side cheeks remote from the body, the width of the tongue being less than the maximum width of the star-shaped head as measured between the furthest apart edges of its side cheeks.

The basic idea of the invention is to use a ring in which the shape of its star-shaped fins facilitates contact with the rod and allows the rod to take up an axial position that is offset relative to the main axis of the fastening ring. The fact that the radial cheeks are wider than the tongue creates a space, behind the radial cheeks, that can receive the rod when said rod is offset axially.

The fastener ring of the invention may advantageously have the following features:

- the radial tip is connected to each side cheek via a curved and concave setback; this setback makes it possible to increase the contact surface area between the fastener ring and the rod when the central axis of the rod is offset axially relative to the main axis of the fastener ring;
- the radial tip forms a fold relative to the tongue and to the side cheeks so as to have an inclination that is accentuated relative to said main axis; this fold facilitates engagement of the radial tip into the notches or threads of the rod;
- the flexible tabs include a set of first additional tabs that are offset angularly from the star-shaped tabs relative to the main axis, and offset axially from the star-shaped tabs along the main axis;
- the flexible tabs include a set of second additional tabs that are offset axially from said first additional tabs; the first and second sets of additional tabs make it possible to occupy the axial orifice to the maximum possible extent; thus, regardless of the axial position of the rod, said rod co-operates with one or the other of the flexible tabs, making it possible to guarantee temporary fastening between the rod and the fastener ring;
- the flexible tabs of at least one of the sets has a radial length that is different from the radial length of the flexible tabs of another set; thus, the potential contact points at which the fastener ring is in contact with the rod are at variable distances from the main axis of the fastener ring, thereby increasing the number of possible axial positions for the rod;
- the flexible tabs of at least one of the sets are mutually coplanar; and
- the free ends of the star-shaped tabs are situated in a main contact plane, and the free ends of at least the first additional tabs or of at least the second additional tabs are situated in a contact plane that is distinct from the main contact plane, namely, respectively, a first contact plane or a second contact plane.

The invention also provides an assembly comprising a part for assembly as assembled to a support that is provided with at least one rod, the assembly being characterized in that the part for assembly is secured to at least one fastening ring according to any preceding claim, the fastening ring being engaged over the rod so as to fasten the part for assembly to the support.

BRIEF DESCRIPTION OF THE DRAWINGS

The present invention can be better understood and other advantages appear on reading the following detailed description of two embodiments given by way of non-limiting example and with reference to the accompanying drawings, in which:

FIG. 1 is a perspective view of a first embodiment of a fastener ring of the invention;

FIG. 2 is a view from above of a detail of a star-shaped tab of the fastener ring of FIG. 1;

FIG. 3 is a fragmentary side view in section of the fastener ring of FIG. 1;

FIGS. 4A to 4E are views from above showing various positions of the rod in the fastener ring of FIG. 1;

FIG. 5 is a perspective view of a second embodiment of a fastener ring of the invention;

FIGS. 6 and 7 are views respectively in cutaway perspective and from above of the fastener ring of FIG. 5; and FIGS. 8 and 9 are views of assemblies of the invention that are formed respectively with the first and with the second embodiments of the fastener ring, the fastener rings being shown in bold black lines.

DESCRIPTION OF EMBODIMENTS

The fastener ring of the invention makes it possible to fasten a part for assembly, e.g. a fuel tank, to a support, e.g. a motor vehicle chassis. In order to facilitate the steps of assembling the tank to the chassis, the tank may be fastened temporarily to the chassis pending final fastening thereto. For this purpose, the chassis is provided with a rod that may be smooth, threaded, or notched, and the tank is provided with the fastener ring described below, which fastener ring is suitable for receiving and locking the rod.

In a first embodiment shown in FIGS. 1 to 4E and 8, the fastener ring 1a of the invention has a substantially cylindrical body 2a through which an axial orifice 3 passes that extends along the main axis A. The body 2a is formed by a substantially cylindrical bushing 20a and by a radial flange 21a that is integral with or secured to a first end of the bushing 20a and that extends outwards from the axial opening 3. As described in detail below, the radial flange 21a enables the fastener ring 1a to be secured, for example to a tank, by any known suitable means.

The second end of the bushing 20a is provided with three star-shaped tabs 4 that are substantially mutually similar, and that extend towards the main axis A. In addition, the star-shaped tabs 4 are inclined towards the inside of the bushing 20a, and are angularly distributed around the periphery of the bushing 20a about the main axis A. As described in detail in FIG. 2, each star-shaped tab 4 is made up of a tongue 40 secured to the bushing 20a and extended by a star-shaped head 41. Each star-shaped head 41 has a rounded radial tip 42 facing towards the main axis A and two rounded side cheeks 43 extending transversely on either side of the tongue 40. Thus, the maximum width L1 of the star-shaped head 41 as measured between the furthest apart edges of the side cheeks 43 is greater than the width L2 of the tongue 40. The radial tips 42 are inclined relative to the tongue 40 along a fold line U so as to have an angle of inclination that is greater relative to the main axis A and that facilitates cooperation with the rod (not shown in FIG. 2).

The radial tip 42 is also connected to each side cheek 43 by a curved and concave setback 44 that also facilitates cooperation with the rod. As shown in FIG. 3, prior to assembly, the radial tips are aligned in a main contact plane P that is perpendicular to the main axis A.

The second end of the bushing 20a is also provided with three first additional tabs 5 that are substantially mutually similar, and that extend towards the main axis A. The free end of each first additional tab 5 is rounded. The first additional tabs 5 are also inclined towards the inside of the bushing 20a. They present a radial length that is less than the radial length of the star-shaped tabs 4 between which they are angularly interposed. Thus, as shown in FIG. 4A, the distance D1 between the free ends of the first additional tabs 5 and the main axis A is greater than the distance D between the free ends of the star-shaped tabs 4 and the same main axis A. This difference in radial length and the angular offset contribute to the possibility of the rod taking up different axial positions that are described in detail below. Prior to assembly, the free ends of the first additional tabs 5 are aligned in a first contact plane P1 that is perpendicular to the main axis A and that is distinct from the main contact plane P.

Between its first and second ends, the bushing 20a is also provided with three second additional tabs 6 that are substantially mutually similar, and that extend towards the main axis A. The second additional tabs 6 are also inclined towards the inside of the bushing 20a and they are obtained by cutting and folding the wall of the bushing 20a. The second additional tabs 6 are of radial length that is slightly less than the star-shaped tabs 4 and that is greater than the length of the first additional tabs 5. Thus, the distance D2 between the free ends of the second additional tabs 6 and the main axis A is greater than the distance D between the free ends of the star-shaped tabs 4 and the main axis A, and less than the distance between the free ends of the first additional tabs 5 and the same main axis A. This difference in radial length contributes to the possibility of the rod taking up the different axial positions. The second additional tabs 6 are angularly aligned with the first additional tabs 5. The free end of each second additional tab 6 is rounded. Prior to assembly, the free ends of the second additional tabs 6 are aligned in a second contact plane P2 that is perpendicular to the main axis A and that is distinct from the main contact plane P and from the first contact plane P1 so that the main contact plane P is situated between the first contact plane P1 and the second contact plane P2.

The layout of the star-shaped tabs 4, of the first additional tabs 5 and of the second additional tabs 6 may be different. Thus, the second additional tabs 6 may be angularly aligned with the star-shaped tabs 4. In addition, the number of star-shaped tabs 4, of first additional tabs 5 and of second additional tabs 6 may be different. Provision may also be made for the second additional tabs 6 to be shorter than the first additional tabs 5.

In the second embodiment shown in FIGS. 5 to 7 and 9, the fastener ring 1b of the invention has a body 2b through which an axial orifice 3 passes that extends along the main axis A. The body 2b is formed of a folded plate, the first and second branches 20b, 21b of which define a right-angled V-shape. The axial orifice 3 passes through the first branch 20b, and the second branch 21b makes it possible to secure the fastener ring 1b, e.g. to the tank, by any known suitable means.

The first branch 20b is provided with three star-shaped tabs 4 that are substantially similar to the preceding ones, and that extend from the axial orifice 3 towards the main axis A. In addition, the first branch 20b is provided with three first additional tabs 5 and with three second additional tabs 6 that are substantially similar to the preceding ones, and that are disposed in similar manner.

FIGS. 8 and 9 show two assemblies 10a, 10b obtained with respective ones of the first and second embodiments of the fastener ring 1a, 1b of the preceding figures. In the examples, each of the assemblies is made up of a fuel tank 100a, 100b assembled to a chassis 200a, 200b of a motor vehicle. The chassis 200a, 200b is provided with rods 201a, 201b, e.g. of the pin type, that are fastened by welding. Thus, the rods 201a, 202b can be positioned accurately. The rods 201a, 201b are fastened perpendicularly to the surface of the chassis 200a, 200b. The tank 100a, 100b has large dimensions and is a made of a plastics material. Thus, it has large dimensional dispersions.

In order to produce one or other of the assemblies 10a, 10b, the procedure is as follows. During a first step, the tank 100a, 100b is equipped with a plurality of a fastener rings 1a, 1b in such a manner that the theoretical positions of the fastener rings 1a, 1b coincide as closely as possible with the positions of the central axes B of the rods 201a, 201b when the tank 100a, 100b is in its predetermined position relative to the chassis 200a, 200b. Due to the dimensional dispersions, the main axes A of the fastener rings 1a, 1b are often offset relative to the theoretical positions and thus relative to the central axes B of the rods 201a, 201b. During a second step, the tank 100a, 100b is placed in its predetermined position by engaging the rods 201a, 201b into the fastener rings 1a, 1b. This engagement is made possible by the specific construction of the fastener rings 1a, 1b that accept axial offsetting of the rods 201a, 201b relative to their respective main axes A. The tank 100a, 100b is thus pre-held on the chassis 200a, 200b and can then be transferred to another workstation at which it is fastened permanently to the chassis 200a, 200b, e.g. by means of screws.

When the rod 201a, 201b is threaded or notched, co-operation between it and the star-shaped tabs 4, and between it and the first and second additional tabs 5, 6 is reinforced by their ends engaging between the threads or notches of the rod 201a, 201b. The resulting assembly 10a, 10b thus has improved resistance to being torn apart.

In the example shown in FIG. 8, the chassis 200a is provided with a threaded rod 201a. The fastener ring 1a is received in an orifice passing through two creep rings 101a disposed on either side of damper rings 102a (or vibration-damping mountings) flanking an orifice 103a provided in the tank 100a. Thus, the radial flange 21a bears against one of the creep rings 101a. The resulting assembly 10a is consolidated by means of a nut 104a screwed onto the threaded rod 201a, beyond the fastener ring 1a.

In the example shown in FIG. 9, the chassis 200b is also provided with a threaded rod 201b. The second branch 21b of the fastener ring 1b is secured to the tank 100b, e.g. by welding.

The special shape of the star-shaped tabs 4 and the presence and the positions of the first and second additional tabs 5, 6 make it possible to guarantee maximum contact between each fastener ring 1a, 1b and the corresponding rod 201a, 201b, when the rod 201a, 201b is in a plurality of axial positions relative to the fastener ring 1a, 1b.

When the dimensional dispersions are minor, then, after assembly, the rod 201a is in a central position as shown by FIG. 4A. In this configuration, the main axis A of the fastener ring 1a and the central axis B of the rod 201a substantially coincide. When dimensional dispersions are greater, the rod 201a can be in any of the positions shown in FIGS. 4B to 4E or in any other position in which the main axis A of the fastener ring 1a and the central axis B of the rod 201a do not coincide.

In the configuration shown in FIG. 4B, the rod 201a is in contact with one star-shaped tab 4, and with two second additional tabs 6 that co-operate to hold it.

In the configuration shown in FIG. 4C, the rod 201a is in contact with one star-shaped tab 4, and with one second additional tab 6.

In the configurations shown in FIGS. 4D and 4E, the rod 201a is in contact with two star-shaped tabs 4, with one first additional tab 5, and with one second additional tab 6.

The invention makes it possible to achieve the above-mentioned objectives. The fastener ring 1a, 1b of the invention makes it possible to take up large dimensional disparities in the support and/or in the part for fastening. By way of indication, a fastener ring 1a, 1b in which the dimensions of its body 2a, 2b are approximately in the range 25 millimeters (mm) to 30 mm can thus accommodate an offset of 7 mm in the central axis B of a rod 201a, 201b of diameter 8 mm relative to its main axis A.

Naturally, the present invention is in no way limited to the above description of two of its embodiments, which can undergo modifications without going beyond the ambit of the invention.

The invention claimed is:

1. A fastener ring for fastening to a rod on a support, said fastener ring comprising:
a body through which an axial orifice having a main axis passes that serves to receive said rod, and
flexible tabs extending radially from the body towards the main axis of said axial orifice and serving to co-operate with said rod to hold it stationary axially relative to said fastener ring, wherein a set of said flexible tabs are star-shaped, each comprising a tongue secured to said body, and extended by a head made up of a rounded radial tip and of two radially rounded side cheeks remote from said body, the width of said tongue being less than the maximum width of said head as measured between furthest apart edges of its side cheeks.

2. The fastener ring according to claim 1, wherein said radial tip is connected to each side cheek via a curved and concave setback.

3. The fastener ring according to claim 1, wherein said radial tip forms a fold relative to said tongue and to said side cheeks so as to have an inclination that is accentuated relative to said main axis.

4. The fastener ring according to claim 1, wherein said flexible tabs include a set of first additional tabs that are offset angularly from said set of star-shaped tabs relative to said main axis, and offset axially from said star-shaped tabs along said main axis.

5. The fastener ring according to claim 4, wherein said flexible tabs include a set of second additional tabs that are offset axially from said set of first additional tabs.

6. The fastener ring according to claim 5, wherein said flexible tabs of at least one of said sets of flexible tabs has a radial length that is different from the radial length of the flexible tabs of another set.

7. The fastener ring according to claim 5, wherein said flexible tabs of at least one of said sets are mutually coplanar.

8. The fastener ring according to claim 5, wherein the free ends of said set of star-shaped tabs are situated in a main contact plane, and in that the free ends of at least said set of first additional tabs or of at least said set of second additional tabs are situated in a contact plane that is distinct from said main contact plane, namely, respectively, a first contact plane or a second contact plane.

9. The fastener ring according to claim 4, wherein said flexible tabs of at least one of said sets of flexible tabs has a radial length that is different from the radial length of the flexible tabs of another set.

10. The fastener ring according to claim 4, wherein said flexible tabs of at least one of said sets of flexible tabs are mutually coplanar.

11. An assembly comprising a part for assembly as assembled to a support that is provided with at least one rod, said assembly being characterized in that said part for assembly is secured to at least one said fastening ring according to claim 1, said fastening ring being engaged over said rod so as to fasten said part for assembly to said support.

* * * * *